United States Patent [19]

Kuo

[11] Patent Number: 6,085,272
[45] Date of Patent: Jul. 4, 2000

[54] TRANSMITTING COMMAND BLOCK DATA USING THE LOWER ADDRESS PART OF THE ADDRESS PHASE

[75] Inventor: D. David Kuo, Santa Clara, Calif.

[73] Assignee: Cardio Logic, Inc., Santa Clara, Calif.

[21] Appl. No.: 09/039,302

[22] Filed: Mar. 14, 1998

[51] Int. Cl.[7] .................................................. G06F 13/40
[52] U.S. Cl. ............................................................ 710/128
[58] Field of Search ................................... 710/126–128; 712/34

[56] References Cited

U.S. PATENT DOCUMENTS

| 5,274,784 | 12/1993 | Arimilli et al. | 395/325 |
| 5,638,520 | 6/1997 | Moyer | 395/308 |
| 5,706,478 | 1/1998 | Dye | 395/503 |
| 5,734,849 | 3/1998 | Butcher | 395/308 |
| 5,944,805 | 8/1999 | Ricks et al. | 710/107 |

Primary Examiner—John A. Follansbee
Attorney, Agent, or Firm—Robert Buckley

[57] ABSTRACT

Apparatus and methods are defined for increasing the effective bandwidth of a system bus for commanding a co-processor in an information processing system. The system processor commands the co-processor by sending a command block including one or more command parameters via the system bus. The bus includes an address phase and a data phase, and the effective bus bandwidth is increased by using a significant portion of the address phase and all of the data phase for sending the command parameters. The system processor disassembles the parameters and packs these into the address portion and the data phase of as few bus transfer commands as required. The co-processor includes a front end which receives the command and uses the command to select an appropriate procedure for unpacking and reassembling the received command parameters. Previous methods have transferred the command parameters using only the data phase of the system bus transfers. The increase in effective bandwidth is proportional to the ratio of the total number of bus transfers previously required to the total number required using the teachings of the invention.

20 Claims, 6 Drawing Sheets

| | | | |
|---|---|---|---|
| 100 | move | AX,CNTL[15:0] | Move Graphics Controls to AX, 16-bit data register |
| 102 | move | EDX,200040h | Move Graphics Controls Address to EDX, address index |
| 104 | move | [EDX],AX | Move Graphics Controls to on-chip register |
| 106 | move | EAX,SSA[19:0] | Move Source Starting Address to EAX, 32-bit data register |
| 108 | shift left | EAX,2 | Adjust address range |
| 110 | move | EDX,EAX | Move SSA to EDX, 32-bit address index register |
| 112 | move | AX,SP[11:0] | Move Source Pitch to AX, the lower 16-bits of EAX |
| 114 | shift left | EAX,16 | Move Source Pitch to the upper 16-bits of EAX |
| 116 | move | BX,CNF[3:0] | Move Configuration data to BX, 16-bit second data register |
| 118 | shift left | BX,12 | Adjust CN[3:0] to the rightmost bit positions |
| 120 | move | AX,BHT[10:0] | Move Block Height to AX |
| 122 | or | AX,BX | Merge CNF[3:0] with BHT[10:0] |
| 124 | move | [EDX],EAX | Write to the video memory pointed to by EDX |
| 126 | move | EAX,DSA[19:0] | Move Destination Starting Address to EAX |
| 128 | shift left | EAX,2 | Adjust address range |
| 130 | move | EDX,EAX | Move DSA to EDX, 32-bit address index register |
| 132 | move | AX,DP[11:0] | Move Destination Pitch to AX |
| 134 | shift left | EAX,16 | Move Destination Pitch to the upper 16-bits of EAX |
| 136 | move | BX,ROP[3:0] | Move Raster Operation Code to BX |
| 138 | shift left | BX,12 | Adjust ROP[3:0] to the rightmost bit positions |
| 140 | move | AX,BWD[10:0] | Move Block Width to AX |
| 142 | or | AX,BX | Merge ROP[3:0] with BWD[10:0] |
| 144 | move | [EDX],EAX | Write to the video memory pointed to by EDX |

FIG. - 14

TRANSMITTING COMMAND BLOCK DATA USING THE LOWER ADDRESS PART OF THE ADDRESS PHASE

BACKGROUND

1. Field of the Invention

The invention relates to information processing systems, and in particular to apparatus and methods for increasing an effective bandwidth of a system bus for commanding a co-processor.

2. Background of the Invention

A co-processor, as the word is used in this patent application, is an element in an information processing system. The co-processor is commanded by a central information processor (hereafter "processor") of the system to perform a portion of an information processing task. Thus the task is shared between the processor and a co-processor.

The purpose of a co-processor in such a system is to permit the system to perform a more complex computational task than would be possible without the existence of the co-processor. The co-processor increases the total computational power of the whole information processing system. The phrase "computational task," as used here, means any and everything an information processing system is called upon to do.

A common example of such an arrangement is the graphics accelerator used to increase the responsiveness of a graphics display, which task would—if attempted solely by the processor—be difficult or impossible to perform at an equivalent level of responsiveness.

In deciding when the use of a co-processor is feasible, the system architect defines a particular computational task, decides how much of the task can realistically be carried out by the processor, and identifies a major portion of the task that will be handled by an, independent co-processor.

In such a division of responsibility, it is necessary for the processor to tell the co-processor what to do, and to provide the co-processor with information needed by the co-processor to carry out its part of the overall task. The processor tells the co-processor what to do by sending it a command, and by sending the needed information as a set of command parameters. The command and command parameters are usually referred to as a command block.

A command block is typically transferred between the processor and the co-processor via a system bus using a sequence of WRITE commands. It is typical for each WRITE command to have an ADDRESS phase and a DATA phase. During the ADDRESS phase, the processor sends an address to the co-processor to cause the co-processor to accept the command block, to identify the information being sent, and to specify which co-processor register receives each parameter. During the DATA phase, the processor sends the command and the various command parameters needed for that particular type of command.

In some system buses, the ADDRESS phase and the DATA phase use separate lines and occur simultaneously. In other bus systems the two phases of the WRITE command share a common set of lines and the ADDRESS phase precedes the corresponding DATA phase.

It is typical to place one or more whole parameters within the DATA phase and to use one WRITE command for transferring those parameters to a co-processor. A sequence of WRITE commands continues until the co-processor command and all its parameters have been transferred. It is also typical to pack as many of the whole parameters as will fit within the DATA phase of each WRITE command. But once a packing scheme has been determined, it is not altered for different types of co-processor commands. Thus, it is common that parameters are passed and then discarded in order to pass one of the parameters in a specific packing scheme that will be used.

It is typical also to use a portion of the ADDRESS phase of each WRITE command is identify the specific parameters being passed. The information is used by the co-processor to insure that each accepted parameter is loaded into the correct co-processor parameter register. This arrangement permits the processor to send the packed parameters in any convenient order—sometimes an advantage in existing systems.

The parameters vary in number and length depending upon the specific co-processor command being sent. At the present time, a typical DATA phase can deliver 32 bits (4 bytes) of information to the co-processor. But since only whole parameters are delivered with each WRITE command, and since the parameters vary in length, there is often inefficiency whenever all 32 bits are unable to be used. The unused bits in each WRITE command are simply wasted. So there is potential waste because all the bits cannot be used, and also because unneeded parameters may be passed.

This situation was not so much of a problem in the past when the speed of the processor and the co-processor were relatively low compared with the bandwidth of the bus. But processor speeds have increased rapidly, as have the speeds of the co-processors. System bus speeds, on the other hand, have remained relatively low in comparison with the speeds of the processors and the co-processors. The speed of the bus is referred to as its bandwidth, so a slow bus is one having a narrow or low bandwidth. The narrow bandwidth system bus has thus become a bottleneck in the task of a processor commanding a co-processor. Command blocks must be shoved through this bottleneck by a very fast processor to a very fast co-processor.

It would be desirable to permit the co-processor to perform as large a portion of the shared computational task as possible, but many tasks which the co-processor could reasonably be expected to carry out are quite small yet require the transfer of many parameters. The system bus bottleneck works against such sharing of the computational task.

What is needed is a way to effectively increase ("more fully utilize") the available bandwidth of a system bus so that the co-processor can realistically assume the burden of these many smaller tasks, freeing the processor for other system work.

SUMMARY OF THE INVENTION

This need is met by the present invention which recognizes that it is unnecessary (1) to use the entire ADDRESS phase for selecting the co-processor and for identifying the various command parameters that are being sent across the system bus, (2) to allow the processor to vary the order in which the parameters are sent, (3) to send only whole parameters with each WRITE command, and (4) to waste space by packing unneeded parameters into a WRITE command.

A specific embodiment of the invention partitions the ADRESS phase into upper and lower address portions and uses both the lower address portion of the ADDRESS phase and all of the corresponding DATA phase to pass command block information to the co-processor. The lower address portion is a significant part of each ADDRESS phase. In a specific embodiment 23 bits of the ADDRESS phase plus all 32 bits of the DATA phase are available for passing parameters. This feature significantly increases utilization of the system bus bandwidth during command block transfers between the processor and the co-processor.

In another specific embodiment of the invention, the processor disassembles the parameters into parts, and packs ("formats") the parts of the disassembled command parameters into as few WRITE commands as possible. The co-processor includes a dispatcher ("state machine") which implements a corresponding unpacking and reassembly ("unformatting") of the transferred parameters. This feature permits the command block to be transferred using fewer WRITE commands, and thus increases the utilization of the system bus bandwidth.

In another specific embodiment of the invention, each co-processor command type has its own packing and unpacking scheme implemented by the processor and by the co-processor dispatcher. This feature permits a packing scheme to be implemented which is tailored to each command for greater efficiency and utilization of the system bus bandwidth.

In another specific embodiment of the invention, the lower address portion of the ADDRESS phase is used to both pass parameters and also to force the system bus to operate in a burst mode for increased utilization of available bus bandwidth. This 'mode forcing' is accomplished by having the processor use one or more ADDRESS phases to pass parameters in a non-burst mode and then to repeatedly send the same information successively incremented by a predetermined integer (typically '4') to force the system bus to operate in an automatic burst mode.

These specific embodiments of the invention define (1) an information processing system for performing a computational task, (2) a communication protocol for performing a computational task, and (3) a co-processor for use with such a system and protocol.

It is an advantage of the invention that an effective bandwidth of a system bus with respect to commanding a co-processor is approximately increased by the ratio of the time required to transfer a command block in which only whole parameters are sent using the DATA phases only, to the time required using both the lower address portion of the ADDRESS phases and the corresponding DATA phases to send disassembled and packed parameters.

It is another advantage of the invention that the increase in system bus effective bandwidth permits the co-processor to be assigned many small tasks which were previously impractical because of the limitations of the system bus bottleneck.

Finally, it is an advantage of the invention that the increase in system bus effective bandwidth is obtained with only a minor increase in processor burden and co-processor complexity.

BRIEF DESCRIPTION OF THE DRAWINGS

For a further understanding of the objects, features and advantages of the present invention, reference should be had to the following description of the preferred embodiment, taken in conjunction with the accompanying drawing, in which like parts are given like reference numerals and wherein.

DESCRIPTION OF THE PREFERRED EMBODIMENT

Figure 1:
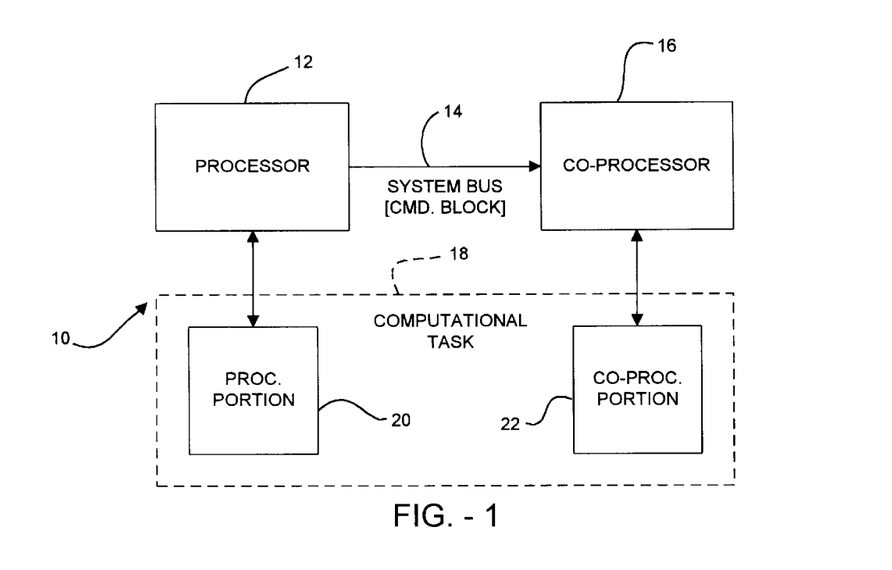
FIG. 1 is a block diagram which illustrates a computational task partitioned between a processor and a co-processor.

With reference to FIG. 1 there is shown a block diagram which illustrates an information processing system for performing a computational task, the system being designated generally by the numeral 10. The system includes a processor 12, a system bus 14, a co-processor 16, and a computational task 18 (within the broken line).

The processor 12 performs a first (processor) portion 20 of the computational task. The co-processor 16 performs a remaining (co-processor) portion 22 of the computational task 18.

The system bus 14 permits the processor 12 to command the co-processor 16 to perform the remaining portion 22 of the computational task 18 by transferring a command. block to the co-processor 16 via the system bus 14.

Figure 2:
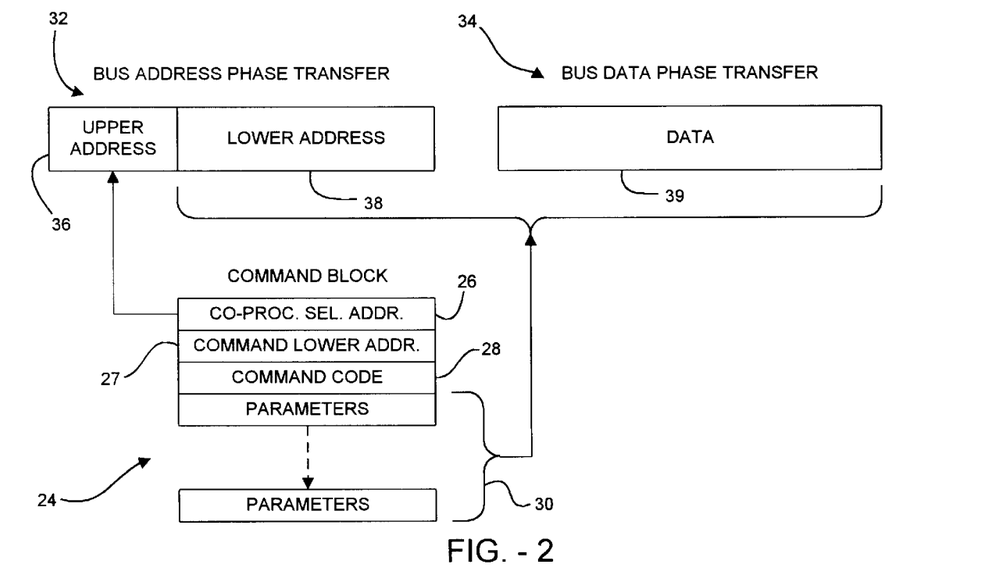
FIG. 2 is a schematic diagram which illustrates an address transfer phase and a data transfer phase for a computer system bus according to one aspect of the invention.

A command block for this purpose is illustrated in the schematic diagram, FIG. 2, wherein the command block is designated generally by the numeral 24. The command block 24 includes a co-processor selection address 26, a command code lower address 27, a command code 28, and one or more command parameters 30.

FIG. 2 also illustrates that the system bus 14 permits the processor 12 to send the command block 24 to the co-processor 16 via both an address phase transfer, designated generally 32, and a data phase transfer, designated generally 34. The address phase transfer 32 includes an upper address part (also "upper address portion") 36 and a lower address part (also "lower address portion") 38. The processor 12 sends the co-processor selection address 26 via the upper address part 36 of the bus address phase transfer 32.

The co-processor 16 receives the address phase transfer 32 via the system bus 14, and is responsive to the co-processor selection address 26 received on the upper address part 36 for receiving the lower address part 38 during the address phase transfer 32, and for receiving a data part 39 during the data phase transfer 34.

The processor 12 uses the lower address part 38 and the data part 39 to transfer the command code 28, and the at least one command parameter 30.

Figure 3:
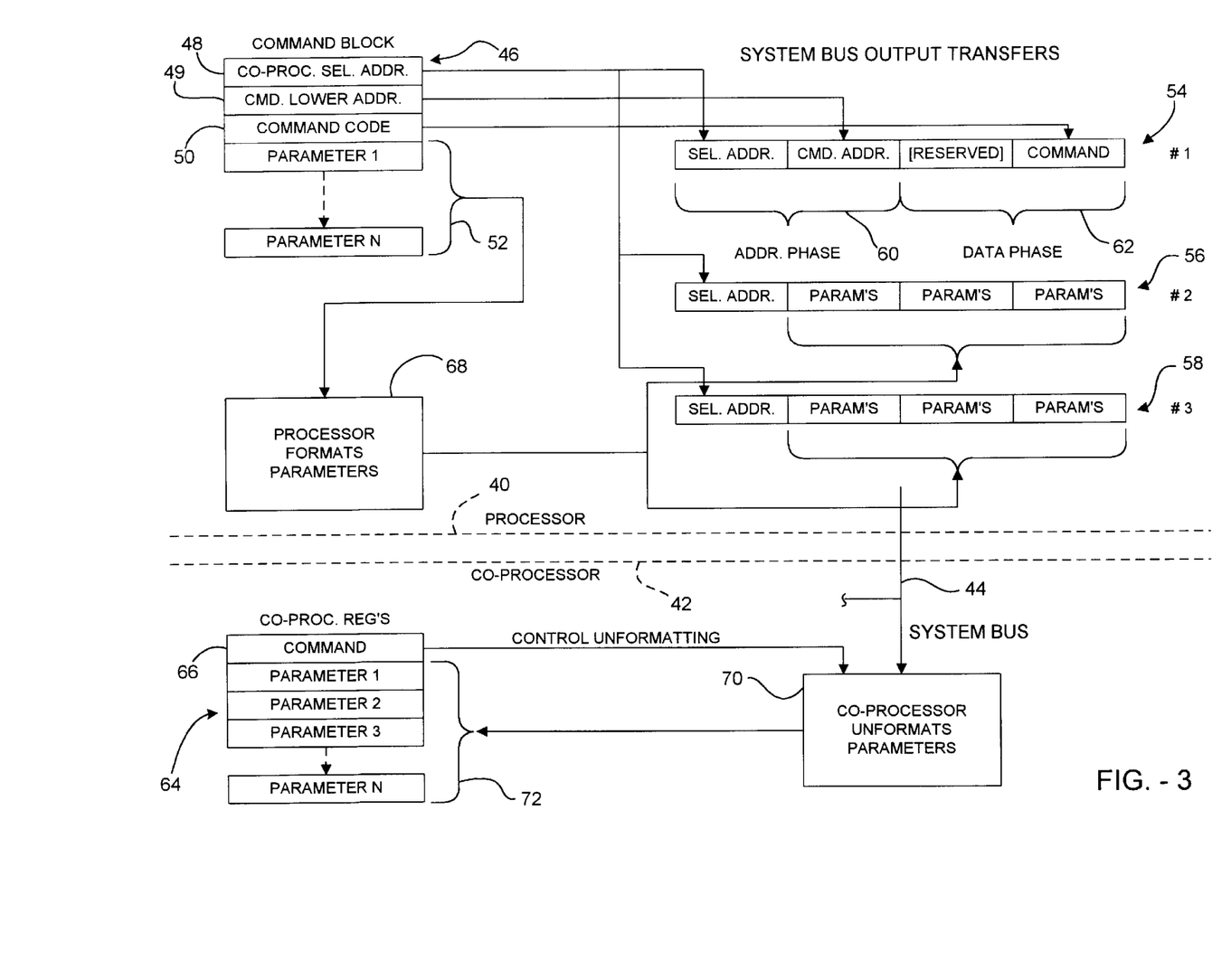
FIG. 3 is a schematic diagram which illustrates the formatting and the unformatting of co-processor command block parameters according to another aspect of the invention.

FIG. 3 is a schematic diagram which illustrates the manner in which command block parameters are formatted ("disassembled and packed") into a lower address portion of a system bus address phase and into a corresponding system bus data phase of a sequence of system bus transfers. FIG. 3 also illustrates the co-processor unformatting ("unpacking and reassembling") the parameters and placing the reassembled parameters into co-processor registers for use during the co-processor execution of the command.

For purposes of illustration in FIG. 3, a pair of horizontal broken lines 40, 42 separate the processor and the co-processor, which are connected via a system bus 44. In general, the processor is designated by the numeral 40 while the co-processor is designated by the numeral 42. A command block shown in the upper left corner of FIG. 3 is designated generally by the numeral 46, and includes a co-processor selection address 48, a command code lower address 49, a command code 50, and one or more command parameters indicated by the side brace 52.

At the upper right side of FIG. 3 there is shown a sequence of three system bus output transfers, designated generally 54, 56, 58, each including an address phase 60 and a data phase 62, respectively.

Co-processor registers are provided for the received command and for each of the received reassembled command parameters, as shown at the lower left corner of FIG. 3. The co-processor registers are designated generally by the numeral 64.

A central feature of the invention includes the use of the lower address portion of the address phase transfer and all of the data phase transfer for moving portions of a command block from the processor to the co-processor.

One practical way to accomplish this feature—the specific way that is used in all the embodiments of the invention—is to partition the co-processor address space, and to use a portion of that address space for transferring packed parameters. This approach permits a large number of bits of the ADDRESS phase, i.e., the lower address portion, to be used for parameter transfer. The greater the number of bits of the ADDRESS phase which are used for the transfer of command block parameters, the greater the increase in utilization of the available system bus bandwidth.

FIG. 2 illustrates that the address phase 32 is partitioned into an upper address portion 36 and a lower address portion 38. FIG. 2 also illustrates that the co-processor selection address 26 is transferred via the upper address portion 36 of the system bus address phase transfer 32. In fact, as illustrated in FIG. 3, the co-processor selection address 48 is transmitted as an upper address portion of each system bus output transfer 54, 56, 58 during the co-processor command block transfer. Though not specifically identified as such in FIG. 3, each embodiment of the invention includes the co-processor selection address as the upper address portion of each system bus output transfer 54, 56, 58. A person skilled in the art will appreciate that no other device connected to the system bus will respond to a system bus output transfer having the co-processor selection address in the upper address portion (36 of FIG. 2). Also, the co-processor will respond only to system bus output transfers which include the co-processor selection address in the upper address portion.

The command code (50 of FIG. 3) is transferred during the data phase 62 of the first system bus output transfer 54, designated "54:62". The command code does not occupy the entire width of the data phase 62, and the remaining portion is reserved. A specific command code lower address 49 occupies the lower address portion (38 of FIG. 2) of the address phase 60 of the first system bus output transfer 54 (54:60). In a specific embodiment of the invention, the command code 50 is transferred via the system bus 44 without being formatted ("packed") in any manner. The received command code is placed into a specific co-processor command register 66. The first system bus output transfer 54 operates in the manner used by all known prior art applications in that the command code lower address 49 is used by the co-processor 42 to direct the unformatted command code 50 to the co-processor command register 66. System bus transfers 56 and 58 include disassembled and packed command parameters 52.

In another specific embodiment, the task assigned to the co-processor (16 of FIG. 1) requires that the co-processor execute more than one type of command. Each command type requires the processor (12 of FIG. 1) to provide a different set of command parameters (30 of FIG. 2; 52 of FIG. 3) unique to the specific command.

An overall goal of the invention is to more fully utilize the available system bus bandwidth for commanding a co-processor. Each of the major features of the invention tend toward this end. The more full bandwidth utilization is referred to often in this patent application as an increase in system bus "effective" bandwidth.

For purposes of this patent application, the system bus effective bandwidth is defined in terms of the number of bytes of "useful" information transferred per system bus output transfer. In known prior art applications useful information is transferred during the data phase only. Thus in a 32-bit wide system bus, four bytes of useful information are transferred per system bus output transfer. In the present invention, useful information is transferred both during the address phase and the data phase of each system bus output transfer. In a specific embodiment of the present invention, three bytes of useful information are transferred during the address phase, and four additional bytes of useful, information are transferred during a corresponding data phase. Therefore each system bus output transfer, under the present invention, transfers seven, as opposed to four, bytes of useful information.

This comparison would suggest that the system bus effective bandwidth under the present invention is 7/4's ("1.75 times") its value in prior art systems. This comparison is misleadingly optimistic however because it assumes that every bit of the lower address portion and every bit of the data portion of every output transfer is used. In general, such efficiency is unattainable and it is more reliable to compare the total number of output transfers needed to transfer a command block under the teachings of both the prior art systems and the present invention. Such comparison reveals that use of the present invention provides a significant advantage in command block transfer speed over prior art methods.

The system bus effective bandwidth is maximized by transferring a command block using the smallest number possible of system bus output transfers 54, 56, 58. In general, the various parameters are of varying number and length. Therefore it is optimum to disassemble one or more of the parameters into groups of bits of varying size and to pack these groups into the fewest possible number of system bus output transfers.

Since the parameters of varying commands differ in number and in length, no single scheme for disassembly and packing is optimum for all commands. Therefore it is a feature of the invention that each command will have its own packing and unpacking procedure. The parameter formatting ("disassembly and packing") procedure (68 of FIG. 3) is implemented in the processor, while the parameter unformatting ("unpacking and reassembly") procedure (70 of FIG. 3) is implemented in the co-processor. The co-processor uses the received command—the contents of the command register 66—to select a specific and appropriate unformatting procedure 70.

In another specific embodiment, the command code (50 of FIG. 3) is not formatted in the manner described above with respect to command parameters. Instead it is transferred in the low-order position of the data phase 62 of the first system bus output transfer 54 (54:62). The co-processor, upon receiving the command code, places it into the command register 66 and thereafter uses the command code to select an unformatting procedure appropriate to a predetermined formatting scheme for the specific command.

In each of the subsequent system bus output transfers 56, 58, the processor uses the predetermined procedure to format ("disassemble and pack") the command parameters 52 into a minimum number of system bus output transfers, using both the lower address portion (38 of FIG. 2) and all of the data phase.

The co-processor receiving the second and third system bus output transfers (56, 58 of FIG. 3) uses the command code stored in the co-processor command register 66 to select the appropriate unformatting procedure 70 for unpacking and reassembling the bits and pieces of specific parameters into copies of the original parameters 52 and placing the copies into appropriate co-processor parameter registers, indicated generally by the side brace 72.

The reason the command code is transferred in the same way that all known prior art applications transfer parts of a command block—using the address phase transfer to select the co-processor and to designate the co-processor register which receives the contents of the data phase transfer—is that the co-processor is frequently asked to perform the same type of command, only the parameters differing. For this reason, in a specific embodiment of the invention, the co-processor command register 66 is loaded only when a new command type (or a first command) is to be executed. This feature permits the processor 40 to command the co-processor 42 by sending a command block including only a co-processor selection address 48 and command parameters 52. The resulting system bus transfers are 56 and 58. The co-processor 42 understands that it is to perform the same command type as last time, using the new parameters received in transfers 56, 58.

It will also be clear to a person having an ordinary level of skill that when even a single bit requires the use of one additional system bus output transfer, the system bus effective bandwidth is reduced. In the example illustrated in FIG. 3, the information contained in the parameter portion of the third system bus output transfer 58 will not fit within the space occupied by the command lower address 49 and the reserved portion of the data phase 62. At any rate, such an approach requires increased complexity within the co-processor and is not used in the preferred embodiment of the invention which is illustrated schematically in FIG. 3.

It will also be appreciated that the number of system bus output transfers required for a command depends upon the specific number and length of parameters required by the command.

Figure 4:
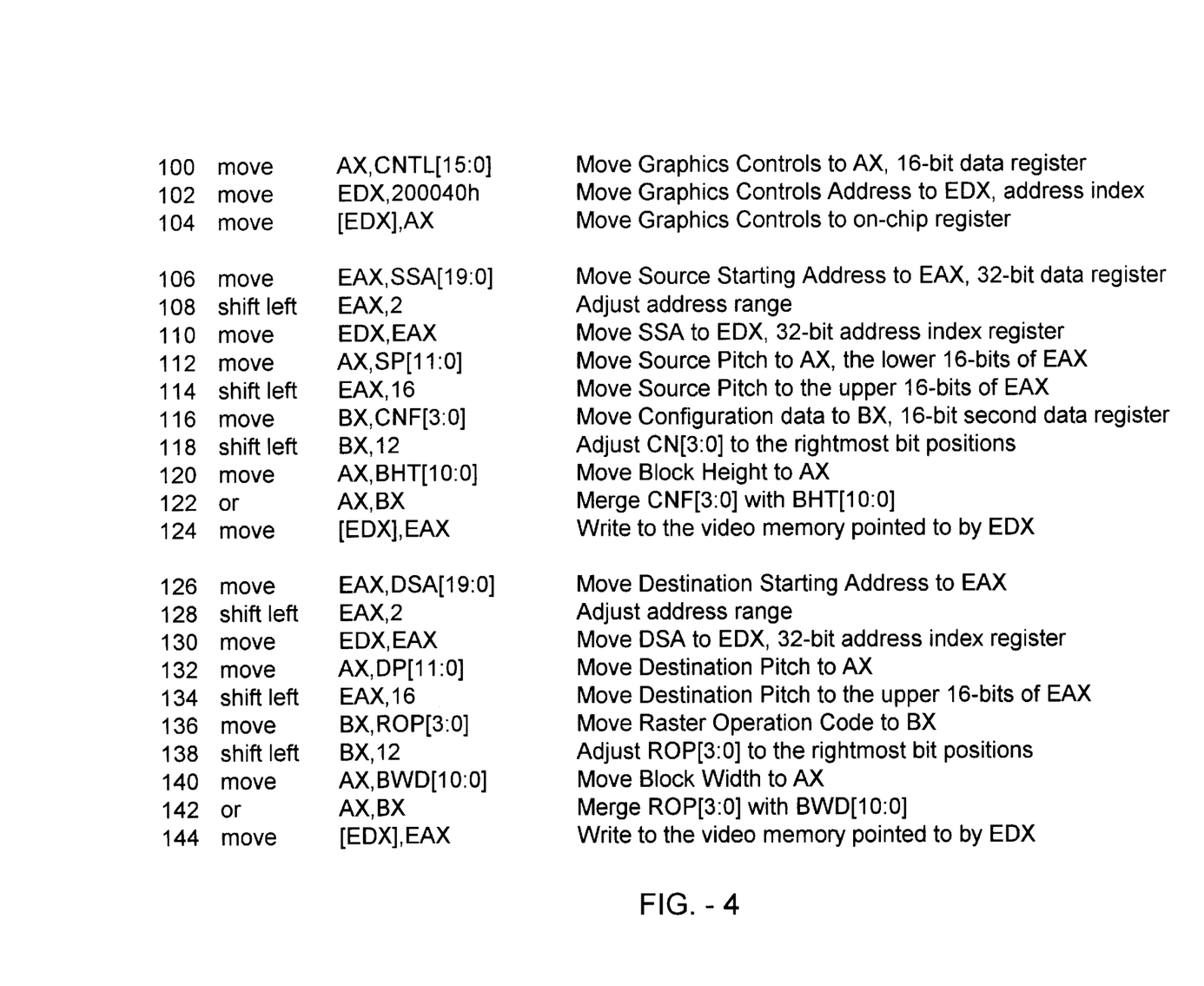
FIG. 4 is a list of pseudo-code commands typical of a processor using the present invention to command a co-processor.
Figure 5:
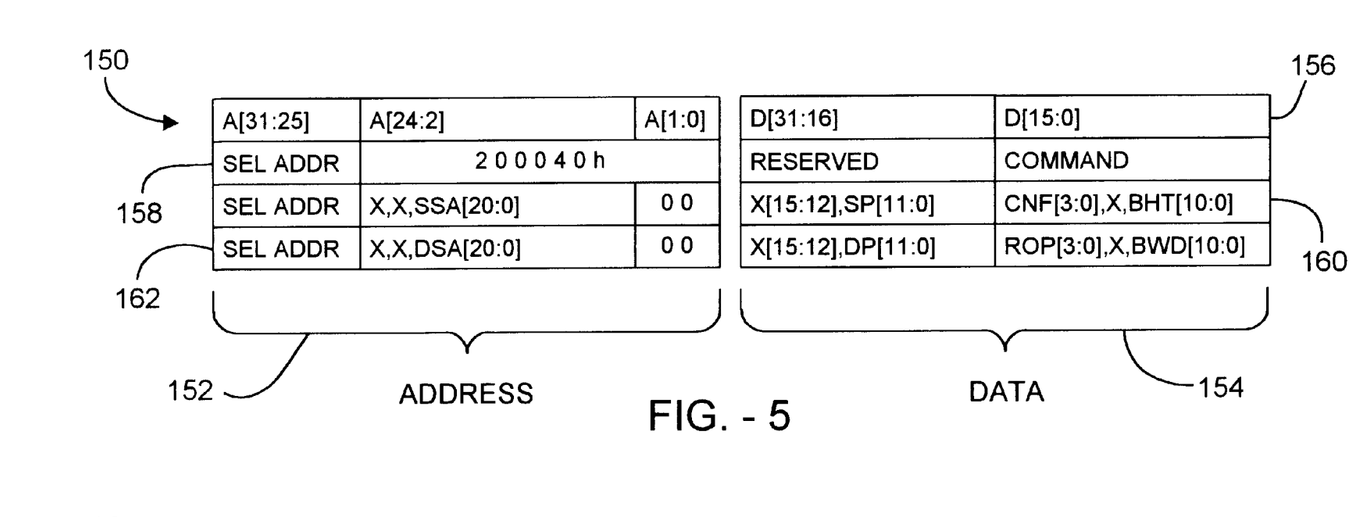
FIG. 5 is a schematic diagram which illustrates parameter formatting for a. multiple-address and multiple-data mode command block transfer.

At this point a specific example will be helpful in gaining a fuller understanding of the invention. FIGS. 4 and 5 will be used for that purpose. FIG. 4 is a pseudo-code listing for an Intel 80×86 type processor having a system bus of the type discussed herein. The pseudo-code is written in an assembly type language and uses names for processor registers which are well known. The co-processor in the example is a graphics accelerator. The pseudo-code illustrates one manner in which a processor formats command parameters to fit within three system bus output transfers. FIG. 5 is a schematic diagram showing what parts of the command block are placed into the various fields of the three output transfers of FIG. 4.

Some of the terminology used in the pseudo-code listing of FIG. 4 differs from the terminology used in the discussions with respect to FIGS. 1, 2, 3 and 5. As stated above, the co-processor is a graphics accelerator. The phrase "graphics controls" refers to the co-processor "command." The "on chip register" corresponds to the command register 66 of the co-processor shown in FIG. 3. From FIG. 4, the parameters of the command block are: SSA, a "source starting address"; SP, a "source pitch"; CNF, "configuration data"; BHT, "block height"; DSA, a "destination starting address"; DP, a "destination pitch"; ROP, a "raster operation code"; and BWD, a "block width".

The system bus output transfers are processor "write" commands to a portion of a "video memory". What this means is that a video memory is addressable via the system bus, and the video memory has been assigned an address space which is at least twice the storage size of the actual video memory. At most, half of that assigned address space is reserved for use by the co-processor graphics accelerator. The reserved address space corresponds to all the addresses within a block having as its most significant address bits the co-processor selection address (26 of FIG. 2; 48 of FIG. 3). In a specific embodiment, there is no memory storage space corresponding to this reserved block of address space—the co-processor is the only element of the information processing system which is responsive to system bus addresses within the reserved block. So a "write to the video memory pointed to by EDX" refers in FIG. 4 to a system bus output transfer directed to the co-processor.

The numbers along the left-hand column of FIG. 4 are line numbers and shall be used to refer to a particular line of the pseudo-code listing. The next column to the right of the line numbers are names of specific 80×86 assembly language commands. The third column is pseudo assembly code corresponding to the assembly language command. The right-most column is a textual description of what it is the processor is doing.

FIG. 5 represents a sequence of three system bus output transfers, designated 150 generally, and corresponding to the three output transfers of FIG. 4. The left-hand half of FIG. 5 represents information transferred via the system bus during the address phases 152, while the right-hand half of the figure represents information transferred during the corresponding data phases 154. FIG. 5 includes four rows, designated 156, 158, 160, and 162 respectively.

In the example shown here, the bus has thirty-two lines (4 bytes wide). For purposes of this example we consider a system bus having thirty-two address lines A[31:0] and thirty-two data lines D[31:0]. A person having an ordinary level of skill in the art will appreciate that in a specific bus, the address lines and the data lines can also share one common set of bus lines. Those shared bus lines carry the address information during an address phase 152, and carry the data information during a data phase 154. For the present example however, separate address lines and data lines are assumed to exist.

Row 156 of FIG. 5 identifies the address lines and the data lines which occupy the information fields illustrated in the rows 158, 160 and 162. Address lines A[31:25] define an upper address portion of the address lines and are used to carry the co-processor selection address (26 of FIG. 2) as indicated in each of the following rows 158, 160, 162 with the phrase "SEL ADDR". Address lines A[24:0] define a lower address portion of the address lines and are further partitioned into a word address field A[24:2] and a byte address field A[1:0]. The data lines are partitioned into two two-byte segments of sixteen lines each: an upper half on data lines D[31:16], and a lower half on data lines D[15:0].

With respect to FIG. 4, lines 100, 102, 104 cause the processor to assemble the information illustrated in row 158 of FIG. 5, corresponding to the first system bus output transfer. The command code (referred to in line 100 as the "graphics controls" and also as "CNTL[15:0]") is placed into the processor AX register (see any 80x86 machine description or assembly language programming guide). The command lower address (49 of FIG. 3; referred to in line 102 as the "graphics control address") is placed into the EDX address index register. In line 104 the command code and the command lower address are transferred via the system bus to the co-processor ("move graphics controls to on-chip register"). The execution of line 104 causes the processor to place the contents of its EDX register onto the address lines A[31:0] and the contents of its AX register onto the data lines D[15:0]. In this manner, the system bus output transfer corresponding to row 158 of FIG. 5 occurs.

The processor executes the pseudo-code instructions of lines 106–124 of FIG. 4 to assemble and transfer the second system bus output transfer 160 of FIG. 5. The letters 'X' in the address and data phases represent unused bits, a single 'X' representing a single unused bit, while X[15:12] indicates a field of four unused bits. Likewise, the processor executes the instructions of lines 126–144 to assemble and transfer the third system bus output transfer 162.

Figure 6:
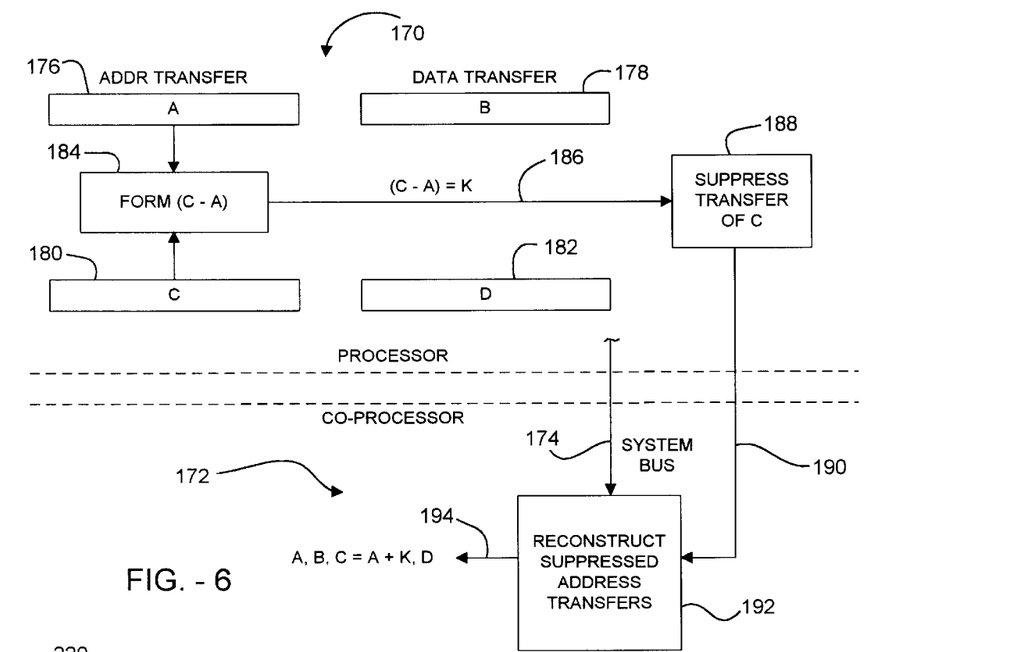
FIG. 6 is a schematic diagram showing a co-processor reconstructing an inhibited address phase transfer in a system bus burst mode of operation.
Figure 7:
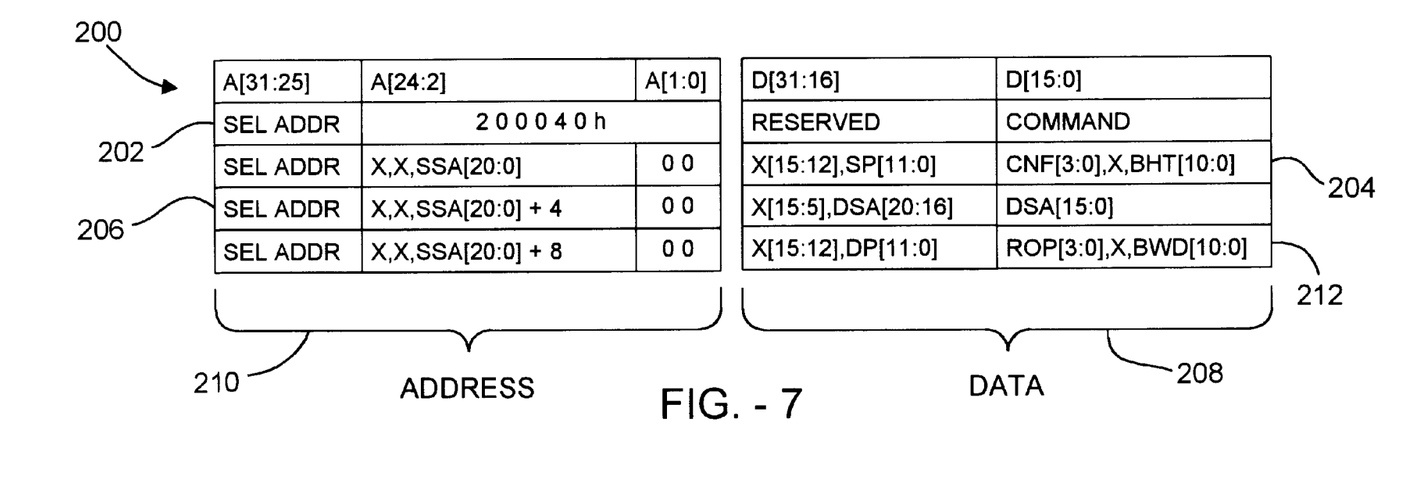
FIG. 7 is a schematic diagram which illustrates parameter formatting for a single-address and multiple-data mode command block transfer relying upon a system bus burst mode of operation.

FIGS. 6 and 7 are schematic diagrams which illustrate aspects of the invention operating with a system bus in a bus burst mode. The more recent members of the Intel 80x86 micro-processor family and various clones, as well as other popular processor architectures, provide an independent controller for the system bus. (See for example, Messmer, H. "The Indispensable PC Hardware Book," 3d ed., pp. 586–595, Addison-Wesley, Harlow, England, 1997.)

One example of such a system bus is the Peripheral Component Interconnect ("PCI") Bus. In an output transfer via the 32-bit PCI bus, when a current address is precisely '4' larger than the previous address, the current address phase is suppressed by the independent bus controller and the corresponding data phase is advanced to take its place, thus increasing the transfer rate momentarily. Control signals are used to inform a connected co-processor that an address phase has been suppressed.

In a specific embodiment, when the contents of a suppressed address phase are needed by the co-processor, the co-processor reconstructs a suppressed address phase, information by adding '4' to the most recently received address phase.

In another specific embodiment, the co-processor does not reconstruct a suppressed address phase transfer. 'Accidental' burst mode operation may occur when the contents of an address phase, when regarded as an integer, are precisely '4' greater than the contents of the previous address phase. In those rare events when this situation occurs, the co-processor responds to the system bus by telling the bus controller that the co-processor does not handle burst mode, and requesting that the suppressed address phase be transmitted.

FIG. 6 is a schematic diagram which illustrates the manner in which the independent system bus controller determines that an address phase shall be suppressed. FIG. 6 includes a processor, designated generally by the numeral 170, a co-processor, designated generally by the numeral 172, and a system bus 174 which connects the processor 170 with the co-processor 172. Two system bus output transfers are shown. The first transfer includes an address part 'A' 176 and a data part 'B' 178, while the second transfer includes an address part 'C' 180 and a data part 'D' 182. Both output transfers include packed command parameters as previously described.

An arithmetic unit 184 subtracts the whole number value of 'A' from the whole number value of 'C'. If the difference 'C–A' is precisely equal to a predetermined constant value 'K', the arithmetic unit 184 produces an output signal on line 186. A control unit 188 responds to the signal on line 186 and does two things: (1) the transfer of 'C' during the current address phase is suppressed and 'D' is transferred in its place; and (2) control signals 190 inform the co-processor 172 that an address phase has been suppressed. The information transfer sequence across the system bus 174 has been 'A', 'B', ['suppressed address phase' 190] 'D'.

A control unit 192 of the co-processor 172 responds to the 'suppressed address phase' control signals 190 by reconstructing the suppressed value 'C'. The control unit 192 does so by forming the sum 'C=A+K'. It is important to keep in mind that event though the values 'A' and 'C' are being treated as whole numbers, they are in fact packed command block parameters. And in the case of a 32-bit PCI bus, the value of the constant 'K' is '4'. The value of 'K' for a 64-bit bus is '8'. In general, the value of 'K' is equal to the width of the system bus as measured in bytes. It is also important to bear in mind that FIG. 6 is illustrative of actions required by an independent system bus controller and a connected co-processor during a burst mode of operation.

FIG. 7 represents a sequence of four system bus output transfers, designated 200 generally. The command parameters are packed to take advantage of a system bus burst mode. A first output transfer 202 is identical with first output transfer 158 of FIG. 5. A second output transfer 204 is identical with second output transfer 160 of FIG. 5. A third output transfer 206 transfers the command parameter DSA [20:0] during the data phase 208, rather than during the address phase 210. The processor (not shown) has insured that the contents of the address phase 208 of the third output transfer 206 are exactly '4' greater than the contents of the previous address phase, output transfer 204. This difference will cause the system bus controller to suppress the address phase of the third output transfer 206 and output the corresponding data phase 208 in its place. In this particular example, the resulting transfer is similar to that which takes place for FIG. 5 in a non-burst mode—the co-processor does not need to re-construct the suppressed address phase transfer because the value of the repeated command parameter SSA[20:0] was transferred during the address phase of the second output transfer 204. The processor also insures that the address phase 210 of a fourth output transfer 212 is exactly '4' larger than the address phase of the previous output transfer 206. This difference again causes the system bus controller to suppress the address phase transfer of the fourth output transfer 212, and to substitute in its place the data phase parameters of the fourth output transfer.

The resulting burst-mode transfer sequence is (1) address phase 202:210, (2) data phase 202:208, (3) address phase 204:210, (4) data phase 204:208, (5) data phase 206:208, (6) data phase 212:208. Compare that sequence with the non-burst-mode sequence for FIG. 5. (1) address phase 158:152, (2) data phase 158:154, (3) address phase 160:152, (4) data phase 160:154, (5) address phase 162:152, (6) data phase 162:154. It is difficult to predict which method produces the greater increase in system bus effective bandwidth.

Figure 8:
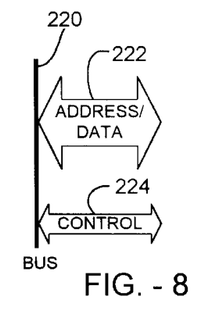
FIG. 8 is a partial schematic diagram which illustrates a system bus having shared address and data lines.

In a specific embodiment of the invention, a system bus 220 includes shared address and data lines 222, as illustrated in FIG. 8, a partial schematic diagram. The system bus 220 also includes various bus control lines 224. During an address phase of an output transfer, the address phase information is transferred via the shared bus lines 222. During a data phase of an output transfer, the data phase information is transferred via the shared bus lines 222. The bus control lines 224 inform a co-processor connected to the bus 220 whether an address phase or a data phase is in progress. The PCI bus is an example of a system bus having shared address and data lines 222.

Figure 9:
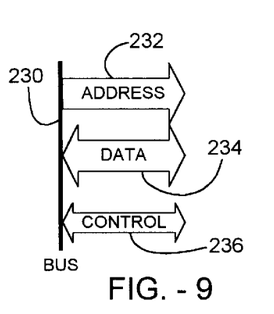
FIG. 9 is a partial schematic diagram which illustrates a system bus having separate address line and data lines.

In another specific example of the invention, a system bus 230 includes separate bus address lines 232 and bus data lines 234, as illustrated in FIG. 9, a partial schematic diagram. The system bus 230 also includes various bus control lines 236. The address phase and the data phase of a transfer occur at the same time via the separate lines. The address phase information is transferred via the bus address lines 232, and the data phase information is transferred via the bus data lines 234

Figure 10:
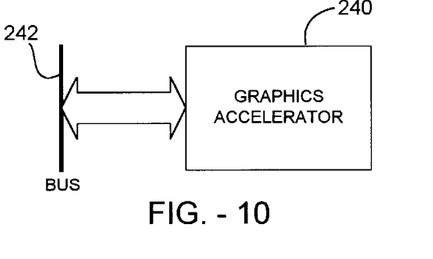
FIG. 10 is a partial schematic diagram illustrating a co-processor acting as a graphics accelerator according to another aspect of the invention.

FIG. 10 is a partial schematic diagram which illustrates another specific embodiment of the invention. In this instance a co-processor 240 defines a graphics accelerator which embodies the invention in its connection with a system bus 242. In an alternative embodiment, the bus 242 is a Peripheral Component Interconnect ("PCI") Bus. In another alternative embodiment, the bus 242 defines an Advanced Graphics Port.

Another specific embodiment of the invention defines a method for performing a computational task (18 of FIG. 1) in an information processing system 10. An initial step of the method provides a platform ("processor") 12 for performing a portion 20 of the computational task 18, a co-processor 16 for performing a balance 22 of the task 18, and a bus 14 used by the processor 12 for commanding the co-processor 16 to perform the co-processor portion 22 of the task.

The method defines bus operating parameters including the bus having an address phase transfer (32 of FIG. 2) and a data phase transfer 34. The address phase transfer 32 includes an upper address part 36 and a lower address part 38. The data phase transfer 34 includes a data part 39.

The method defines a co-processor command block (24 of FIG. 2) including a co-processor selection address 26 using the upper address part 36, a co-processor command code 28, and at least one co-processor command parameter, designated generally by the side brace 30.

The method includes a step of the processor (40 of FIG. 3) forming a command block transfer 54, 56, 58 using the lower address part and the data part for the at least one co-processor command parameter 52.

The method includes a step of the processor 40 using the command block transfer 54, 56, 58 to command the co-processor 42.

The method concludes with a step of the co-processor (16 of FIG. 1) performing the balance 22 of the computational task 18.

A further embodiment of the method includes the steps of each command code (50 of FIG. 3) defining a corresponding set of command parameters 52, the co-processor 42 performing a predefined task in response to each received command code 66 and using the corresponding set of command parameters 72. The processor 40 formats 68 the command parameters 52 into a plurality of address phase transfers and data phase transfers 54, 56, 58 by placing the formatted command parameters into the lower address parts (38 of FIG. 2) and the data parts 39 of the transfers.

In another specific embodiment of the invention, the defined method includes the provided platform bus having an intermittent burst mode of operation (see the description relating to FIGS. 6, 7) such that when the lower address parts of an address phase transfer (176 of FIG. 6) and a next address phase transfer 180 differ by a predetermined integer 'K', the next address phase transfer 180 is suppressed, the corresponding data phase transfer 182 being transmitted in its stead. The method also includes a step of the co-processor creating ("reconstructing") 192 the suppressed lower address part by adding the predetermined integer 'K' to the most recent one of the previously received lower address part and the previously created lower address part. When a single address phase is suppressed, the most recently received address phase is added to the predetermined integer 'K' to reconstruct the suppressed address phase when needed. But when more than one address phase is suppressed, the most recently reconstructed address phase is added to the predetermined integer 'K' to reconstruct the suppressed address phase when needed, as illustrated in FIG. 7.

Another embodiment of the method includes a step of the co-processor using the command code to unformat the received formatted command parameters. This aspect of the method is described with respect to FIG. 3 where the contents of the command register 66 are used by the co-processor 42 to select a specific unpacking and reassembly procedure 70 for unformatting the received parameters 72.

In another specific embodiment of the method, the provided platform bus (242 of FIG. 10) is one of a Component Interconnect Bus and an Advanced Graphics Port, and the provided co-processor is a graphics accelerator 240.

FIGS. 11–14 illustrate a specific embodiment of the invention which defines a control unit ("co-processor") for connection to a bus in a system having a sending unit ("bus controller") for transferring first and second information groups ("address and data phases") to the control unit via the bus. A portion of the first information group defines a block address ("co-processor selection address") and another portion of the first information group and all of the second information group are available for programmable information ("command block") transfer by the sending unit.

Figure 11:
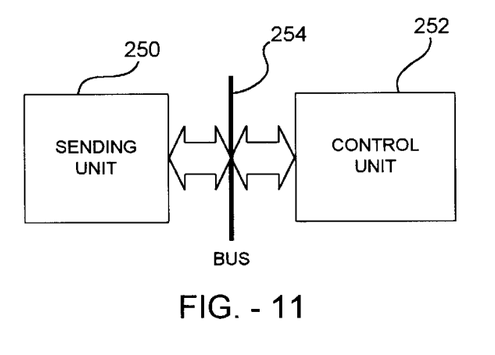
FIG. 11 is a partial schematic diagram which illustrates a sending unit and a receiving unit connected via a system bus.

FIG. 11 is a partial schematic diagram which illustrates a sending unit 250 and a control unit 252 connected via a system bus 254.

Figure 12:
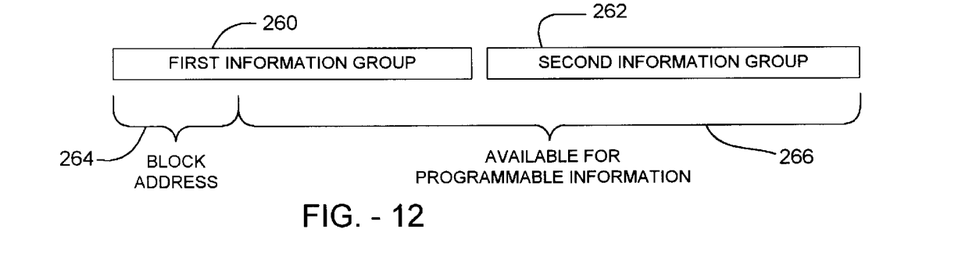
FIG. 12 is a schematic diagram which illustrates first and second information groups partitioned into a block address, and available for a command block parameter transfer.

FIG. 12 is a schematic diagram which illustrates first and second information groups, 260 and 262 respectively, partitioned into a block address 264, and a portion 266 available for programmable information.

Figure 13:
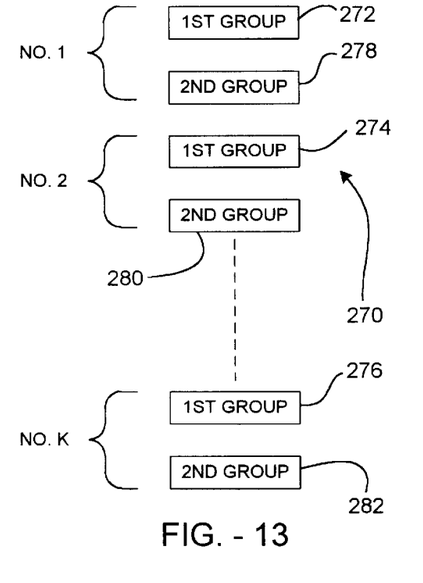
FIG. 13 is a schematic diagram showing a sequence of first and second information groups used to transfer a command block between a sending unit and a receiving unit.

FIG. 13 is a schematic diagram showing a sequence, designated generally by the numeral 270, of first 272, 274, 276 and second 278, 280, 282 information groups used to transfer programmable information between the sending unit (250 of FIG. 11) and the control unit 252.

Figure 14:
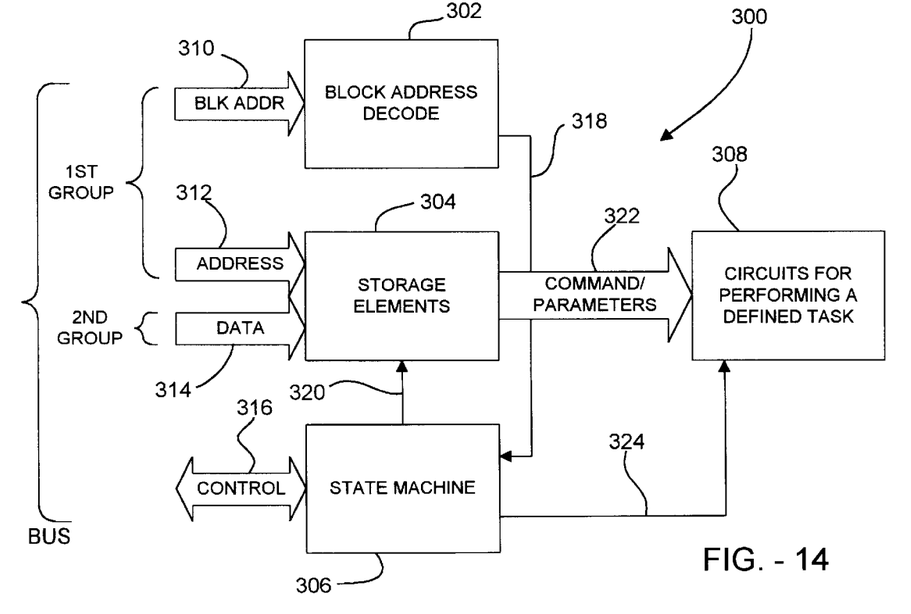
FIG. 14 is a block diagram which illustrates a co-processor front-end according to the present invention.

FIG. 14 is a block diagram which illustrates a control unit according to the present invention. The control unit is designated generally by the numeral 300. The control unit 300 includes a block address decode circuit 302, storage elements (e.g., registers) 304, a state machine 306, and circuits 308 for performing a defined task.

The block address decode circuit 302 is connected 310 to the bus (254 of FIG. 11) to receive the block address portion (264 of FIG. 12) of each first information group (260 of FIG. 12). The storage elements are connected 312, 314 to the bus to receive the programmable information portion (266 of FIG. 12) of each first and second information group (FIGS. 12, 13). The state machine 306 is connected 316 to bus control signal lines.

The block address decode circuit provides a signal 318 to inform the state machine 306 that a bus output transfer is directed to the control unit 300. The state machine 306 provides control signals, designated by the single line 320, to the storage elements 304 for controlling (1) command code capture, and (2) command parameter capture and unformatting. The storage elements 304 provide the captured command code and unformatted command parameters 322 to the circuits 308 for performing a defined task. And the state machine 306 provides a signal 324 to the circuits 308 for performing a defined task to cause the circuits 308 that a valid command block (also referred to as a "super command") has been received.

The block address decode circuit 302, the storage elements 304, the state machine 306, their respective interconnections 318, 320, and their connections 310, 312, 314, 316 with the bus (254 of FIG. 11) define a command dispatcher (the control unit "front end"). The command dispatcher and the formatted programmable information (266 of FIG. 12) define a super command communication protocol. A person skilled in the art will appreciate that the noted advantages of the super command protocol and dispatcher are available for use with co-processor tasks of many different types. In a specific embodiment (FIG. 10) the super command protocol and dispatcher are employed in a graphics accelerator.

In a specific embodiment of the super command dispatcher and communication protocol, the programmable information includes more than one task parameter and will not fit within a single first and second information group transfer. When this is the case, the programmable information (266 of FIG. 12) is delivered by the sending unit (250 of FIG. 11) via the bus (254 of FIG. 11) using as many first and second information group transfers (270 of FIG. 13) as are required to pass the parameters to the control unit (300 of FIG. 14).

In another specific embodiment of the super command dispatcher and communication protocol, at least one of the task parameters is formatted to reduce the number of first and second information group transfers (270 of FIG. 13) required to transfer the parameters to the control unit. It is to be understood that in general, the sending unit (250 of FIG. 11) is not responsible for formatting any task parameters. It is more correct to regard the sending unit 250 as a specialized controller which defines bus operation, and in the case of a port, defines the port operation. The sending unit is responsible only for sending the programmable information to the control unit (252 of FIG. 11). As has been previously described with respect to FIG. 14, the storage elements 304 and the state machine 306 cooperate in unformatting any formatted task parameters. The procedure of unformatting ("unpacking and reassembly") has been described above. In particular, the unformatting uses the information defining a specific task to control the unformatting of the received task parameters.

In another specific embodiment of the super command dispatcher and communication protocol, the sending unit defines an intermittent burst mode of operation. The burst mode has been described above, but in particular may be invoked "accidentally" as when two adjacent first information groups differ by exactly the value of a predetermined integer, and "intentionally" as when a source for a sequence of first and second information groups (270 of FIG. 13) causes one or more adjacent first information group values to differ by exactly the value of the predetermined integer. As described above with respect to FIGS. 6, 7, the sending unit suppresses the transfer of a first information group and transfers in its place the corresponding second information group. When the control unit (252 of FIG. 11) needs the suppressed programmable information, it reconstructs the information by adding the value of the predetermined integer to the most recent of a received first information group and a reconstructed first information group.

Finally, in another specific embodiment of the super command dispatcher and communication protocol, the sending unit (250 of FIG. 11) defines one of a Peripheral Component Interconnect Bus and an Advanced Graphics Port, and the control unit defines; a graphics accelerator.

While the invention has been described in relation to the embodiments shown in the accompanying Drawing figures, other embodiments, alternatives and modifications will be apparent to those skilled in the art. It is intended that the Specification be only exemplary, and that the true scope and spirit of the invention be indicated by the following claims.

What is claimed is:

1. An information processing system for performing a computational task, the system comprising:

a processor for performing a first portion of the computational task;

a co-processor for performing a remaining portion of the computational task;

a system bus permitting the processor to command the co-processor to perform the remaining portion of the computational task by transferring a command block to the co-processor;

the system bus providing an address phase transfer and a data phase transfer, and the address phase transfer having an upper address part and a lower address part;

the co-processor being responsive to a co-processor selection address received on the upper address part for receiving the lower address part during the address phase transfer, and for receiving a data part during the data phase transfer;

the command block including the co-processor selection address, a co-processor command code, and at least one co-processor command parameter; and the processor using the lower address part and the data part to transfer the at least one command parameter.

2. The system as set forth in claim 1, wherein each command code defines a corresponding set of command parameters, the co-processor performing a predefined task in response to each received command code using the corresponding set of command parameters, and the processor formatting the command parameters into a plurality of address phase transfers and data phase transfers and placing the formatted command parameters into the lower address parts and the data parts of the transfers.

3. The system as set forth in claim 2, wherein the co-processor uses the command code to control the unformatting of the received formatted command parameters.

4. The system as set forth in claim 2, wherein the bus includes an intermittent burst mode of operation which is activated when the lower address part of successive transfers differ by a predetermined integer, causing a current address phase transfer to be suppressed and the corresponding data phase transfer to be transmitted in its place.

5. The system as set forth in claim 1, wherein the address and the data phase transfers share a common set of bus lines, bus control signals being used to distinguish between the two phases, the co-processor operating accordingly.

6. The system as set forth in claim 1, wherein the address and the data phases use separate bus lines, one set of lines for the address phase, and another set of lines for the data phase, the co-processor operating accordingly.

7. The system as set forth in claim 4, wherein the bus is one of a Peripheral Component Interconnect Bus and an Advanced Graphics Port, and the co-processor is a graphics accelerator.

8. A method for performing a computational task in an information processing system, comprising the steps of:
providing a platform for performing the computational task, the platform including a processor for performing a portion of the task, a co-processor for performing a balance of the task, a bus used by the processor for commanding the co-processor to perform the balance of the task;
defining bus operating parameters including the bus having an address phase transfer and a data phase transfer, and the address phase transfer including an upper address part and a lower address part, and the data phase transfer including a data part;
defining a co-processor command block including a co-processor selection address using the upper address part, a co-processor command code, and at least one co-processor command parameter;
the processor forming a command block transfer using the lower address part and the data part for the at least one co-processor command parameter;
the processor using the command block transfer to command the co-processor; and
the commanded co-processor performing the balance of the computational task.

9. The method as set forth in claim 8, wherein each command code defines a corresponding set of command parameters, the co-processor performing a predefined task in response to each received command code using the corresponding set of command parameters, and the processor formatting the command parameters into a plurality of address phase transfers and data phase transfers placing the formatted command parameters into the lower address parts and the data parts of the transfers.

10. The method as set forth in claim 9, wherein the provided platform bus includes an intermittent burst mode of operation which is activated when the lower address part of successive transfers differ by a predetermined integer, causing a current address phase transfer to be suppressed and the corresponding data phase transfer to be transmitted in its place.

11. The method as set forth in claim 9, further including the step of the co-processor using the defined command code to unformat the received formatted command parameters.

12. The method as set forth in claim 10, wherein the provided platform bus is one of a Component Interconnect Bus and an Advanced Graphics Port, and the provided co-processor is a graphics accelerator.

13. A control unit for connection to a bus in a system having a sending unit for transferring first and second information groups via the bus, and in which a portion of the first information group defines a block address and another portion of the first group and all of the second group are available for programmable information transfer, the control unit comprising:
a bus connection for receiving the first and the second information groups;
means responsive to a defined block address for accepting the other portion of the first information group and for accepting the second information group;
the programmable information defining a specific task and including at least one task parameter; and
means for using the programmable information to perform a defined task.

14. The control unit as set forth in claim 13, further including means for decoding the block address and a state machine enabled by the decoded block address for managing the accepting of the programmable information.

15. The control unit as set forth in claim 13, further including storage elements for receiving the programmable information and for retaining said information during the performing of the defined task.

16. The control unit as set forth in claim 13, wherein the programmable information includes a first plurality of task parameters contained within a second plurality of first and second information group transfers, and wherein the control unit includes means compatible with said programmable information for performing the defined task.

17. The control unit as set forth in claim 16, wherein at least one of the plurality of task parameters is formatted to reduce the number of first and second information group transfers required to transfer the programmable information to the control unit, and the control unit includes means for unformatting the at least one formatted task parameter.

18. The control unit as set forth in claim 17, wherein the control unit uses the information defining a specific task to control an unformatting of the received at least one formatted command parameter.

19. The control unit as set forth in claim 16, wherein the sending unit defines an intermittent burst mode of operation which is activated when successive first information groups differ by a predetermined integer, causing a current first information group transmission to be suppressed and the corresponding second information group to be transmitted in its place, and wherein the control unit reconstructs the suppressed first information group when the suppressed information is required for the performance of the defined task.

20. The control unit as set forth in claim 19, wherein the sending unit defines one of a Peripheral Component Interconnect Bus and an Advanced Graphics Port, and the control unit defines a graphics accelerator.

* * * * *